(12) United States Patent
Betz et al.

(10) Patent No.: US 7,944,680 B2
(45) Date of Patent: May 17, 2011

(54) HIGH-VOLTAGE SWITCHGEAR (75) Inventors: Thomas Betz, Langenselbold (DE); Gnanadhandapani Ilango, Zurich (CH); Carlo Granata, Canevago d'Adda (IT); Wolfgang Wilhelm, Heddesheim (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/602,436

(22) PCT Filed: May 26, 2008

(86) PCT No.: PCT/EP2008/004167
§ 371 (c)(1),
(2), (4) Date: Nov. 30, 2009

(87) PCT Pub. No.: WO2008/145324
PCT Pub. Date: Dec. 4, 2008

(65) Prior Publication Data
US 2010/0172069 A1    Jul. 8, 2010

(30) Foreign Application Priority Data

May 31, 2007   (DE) .......................... 10 2007 025 536
Oct. 2, 2007    (DE) .......................... 10 2007 047 200

(51) Int. Cl.
*H02B 1/20*    (2006.01)
(52) U.S. Cl. ......... 361/612; 361/618; 361/619; 361/621
(58) Field of Classification Search ........................ None
See application file for complete search history.

(56) References Cited

U.S. PATENT DOCUMENTS

| 5,045,968 | A |   | 9/1991  | Suzuyama et al. |         |
|-----------|---|---|---------|-----------------|---------|
| 5,373,415 | A | * | 12/1994 | Tawaratani      | 361/612 |
| 5,559,669 | A | * | 9/1996  | Inami et al.    | 361/612 |
| 5,578,804 | A | * | 11/1996 | Berger et al.   | 218/43  |
| 5,589,674 | A | * | 12/1996 | Berger et al.   | 218/71  |
| 5,757,614 | A | * | 5/1998  | Hachida et al.  | 361/602 |
| 5,991,148 | A | * | 11/1999 | Heil et al.     | 361/605 |
| 6,134,101 | A | * | 10/2000 | Bucher et al.   | 361/612 |

(Continued)

FOREIGN PATENT DOCUMENTS

DE    1980777    3/1968

(Continued)

OTHER PUBLICATIONS

International Search Report dated Mar. 12, 2008 for Application PCT/EP2008/004167 filed May 26, 2008.

(Continued)

*Primary Examiner* — Boris L Chervinsky
(74) *Attorney, Agent, or Firm* — Leydig, Voit & Mayer, Ltd.

(57) ABSTRACT

A metal-encapsulated, gas-insulated high-voltage switchgear assembly includes a three-phase encapsulated busbar housing, at least one busbar disposed in the housing, and at least three single-phase-encapsulated circuit breakers disposed horizontally. The assembly further includes a busbar splitting module having at least one three-phase connecting flange configured to connect to the busbar housing and at least three single-phase connecting flanges pointing downward configured to connect to the at least three single-phase-encapsulated circuit breakers and an outgoer splitting module having at least one three-phase flange and at least three single-phase flanges pointing downward and configured to connect the at least three single-phase-encapsulated circuit breakers to a three-phase-encapsulated outgoer housing.

10 Claims, 7 Drawing Sheets

U.S. PATENT DOCUMENTS

| | | | |
|---|---|---|---|
| 6,614,648 B2 * | 9/2003 | Yamane et al. | 361/612 |
| 6,624,372 B1 | 9/2003 | Ogawa et al. | |
| 7,391,605 B2 * | 6/2008 | Sologuren-Sanchez et al. | 361/612 |
| 7,515,398 B2 * | 4/2009 | Takao et al. | 361/612 |
| 2010/0118472 A1 * | 5/2010 | Fujita et al. | 361/612 |

FOREIGN PATENT DOCUMENTS

| | | |
|---|---|---|
| DE | 2720325 A1 | 11/1978 |
| DE | 102004061358 A1 | 7/2006 |
| EP | 0165184 A1 | 12/1985 |
| EP | 0564899 A2 | 10/1993 |
| EP | 0872931 A2 | 10/1998 |
| EP | 1249910 A2 | 10/2002 |
| EP | 1569310 A1 | 8/2005 |
| WO | WO-0167573 A1 | 9/2001 |
| WO | WO-2006066785 A1 | 6/2006 |

OTHER PUBLICATIONS

German Search Report dated Jul. 24, 2008 for Application DE102007047200.7.

* cited by examiner

HIGH-VOLTAGE SWITCHGEAR

This is a U.S. National Phase Application under 35 U.S.C. §371 of International Application PCT/EP2008/004167, filed on May 26, 2008, which claims priority to German Application No. DE 10 2007 025 536.7, filed on May 31, 2007 and German Application No. DE 10 2007 047 200.7, filed on Oct. 2, 2007. The International Application was published in German on Dec. 4, 2008 as WO 2008/145324 under PCT Article 21 (2).

The invention relates to a metal-encapsulated, gas-insulated high-voltage switchgear assembly.

BACKGROUND

It is known for single-phase-encapsulated circuit breakers which each have a separate encapsulating housing and a separate drive to be used in gas-insulated high-voltage assemblies with rated voltages of 200 kV and more.

Such a metal-encapsulated, gas-insulated high-voltage switchgear assembly is known from EP 0872931 A2 which has single-phase-encapsulated circuit breakers and single-phase-encapsulated busbars. The circuit breakers are in this case arranged horizontally on a plane, with the housing of the busbars being arranged above the circuit breakers. Each busbar comprises three housings which are arranged parallel to one another, specifically in each case one housing for each phase conductor, with the longitudinal axes of these housings running at right angles to the longitudinal axes of the circuit breakers.

A high-voltage switchgear assembly such as this occupies a relatively large amount of space, in particular because an unusable empty space remains between the individual components.

SUMMARY OF THE INVENTION

An aspect of the invention is to design a high-voltage switchgear assembly of the type mentioned initially such that the space requirement is minimized.

According to the invention, the at least one busbar is arranged in a three-phase-encapsulated busbar housing, that is to say that all three phase conductors of the busbar are located in common encapsulation. A busbar splitting module which has three single-phase connecting flanges for connecting the circuit breakers and at least one three-phase connecting flange for connecting the busbar housing is provided for connection of the circuit breakers to the busbar housing. An outgoer splitting module which has three single-phase connecting flanges and at least one three-phase flange is provided for connection of the circuit breakers to a three-phase-encapsulated outgoer housing. The busbar splitting module and the outgoer splitting module are in this case arranged such that the single-phase connecting flanges point downward.

In this context, a single-phase connecting flange means a connecting flange through which a single phase conductor is passed. In this context, a three-phase connecting flange means a connecting flange through which three phase conductors of a three-phase system are passed.

This arrangement advantageously reduces the space requirement of the high-voltage switchgear assembly.

Isolators and grounding means associated with the at least one busbar are advantageously arranged in the busbar housing. These mechanically moving elements are therefore relatively easily accessible for maintenance or repair purposes. No mechanically moving elements that require maintenance are provided in the busbar splitting module, which is surrounded by other components such as busbar housings and circuit breakers and to which access is therefore relatively difficult.

According to one advantageous refinement of the invention, one extension tube is provided in each case for each phase, between the outgoer splitting module and the circuit breakers. The use of extension tubes such as these allows variable-height positioning the flange for connection of the outgoer housing. This is advantageous, for example, for use in a cable outgoer panel, since the connecting flange of a cable outgoer housing is located at a predetermined minimum height above the ground, by virtue of its design. A further advantage is that a current transformer can be provided in each of the extension tubes.

Alternatively or in addition to the extension tubes, an angle module is provided on the outgoer splitting module on which an adaptor flange for connection of a voltage converter or of a test adaptor, as well as an outgoer flange for connection of the outgoer housing are provided.

According to a further advantageous refinement of the invention, a gangway is provided between the busbar splitting module and the outgoer splitting module, and extends parallel to the busbar housing. A gangway such as this simplifies the access to further components of the high-voltage switchgear assembly, such as drive boxes or current transformers.

In one advantageous development, at least four three-phase connecting flanges, in each case for the connection of one busbar housing, are provided on the busbar splitting module. A busbar splitting module such as this, which is also referred to as a quadruple busbar splitting module, allows comparatively flexible operation of the high-voltage switchgear assembly. For example, all four connected busbars can be switched independently of one another. In this case, by way of example, three busbars may be in operation while the fourth busbar is used as a spare. It is also feasible for two busbars to be connected in parallel in each case, and to be operated as a busbar pair. This results in the high-voltage switchgear assembly having two busbar pairs, with the advantage that the rated current of a busbar pair is twice as high as the rated current of a single busbar.

The busbar splitting module normally has an cylindrical housing body and at least four three-phase connecting stubs, which project out of the housing body of the busbar splitting module in the radial direction. As used herein, cylindrical means approximately cylindrical. One three-phase connecting flange is in this case attached to each connecting stub.

Each of the three-phase connecting stubs of the busbar splitting module is in this case arranged offset with respect to the respectively adjacent three-phase connecting stub, both in the axial direction and in the circumferential direction with respect to the housing body. This offsetting of the three-phase connecting stubs in the axial direction and in the circumferential direction prevents the three-phase connecting flanges from colliding with one another.

Further advantageous refinements of the invention can be found in the dependent claims.

BRIEF DESCRIPTION OF THE DRAWINGS

The invention, advantageous refinements and improvements of the invention, as well as further advantages will be explained and described in more detail with reference to the drawings, in which exemplary embodiments of the invention are illustrated, and in which.

DETAILED DESCRIPTION

Figure 1:
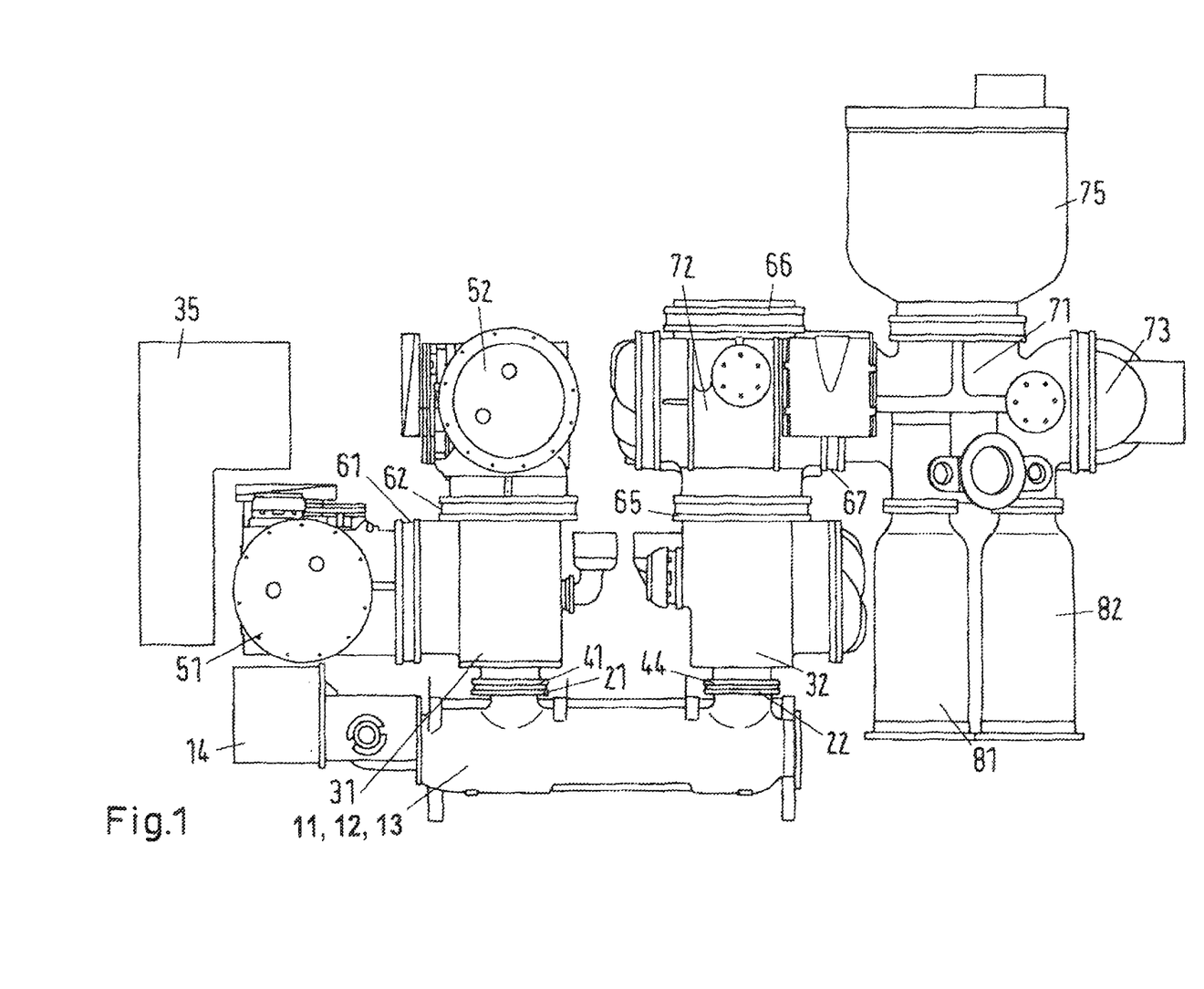
FIG. 1 shows a first cable outgoer panel of a switchgear assembly according to the invention.

FIG. 1 shows a first cable outgoer panel of a switchgear assembly according to the invention. Three single-phase-encapsulated circuit breakers 11, 12, 13, of which only the first circuit breaker 11 can be seen in the illustration shown, are arranged such that their longitudinal axes run parallel to one another and parallel to the ground. Expressed in other words, the single-phase circuit breakers 11, 12, 13 are arranged horizontally. The distance between the circuit breakers 11, 12, 13 and the ground is in this case the same.

The circuit breakers 11, 12, 13 are arranged close to the ground, and this is referred to in the following text as "bottom". The position of the components arranged at a distance from the ground is correspondingly referred to as "top".

The first circuit breaker 11 has an input flange 21, which is adjacent to the front face of the cable outgoer panel, and an output flange 22, which is adjacent to the rear face of the cable outgoer panel, which flanges are aligned parallel to the ground and point upward.

A busbar splitting module 31 is provided for connection of the circuit breakers 11, 12, 13 to a first busbar housing 51 and to a second busbar housing 52. The busbar splitting module 31 has three single-phase connecting flanges 41, 42, 43, of which only the first single-phase connecting flange 41 can be seen in this illustration. Furthermore, the busbar splitting module 31 has a first three-phase connecting flange 61 for connection of the first busbar housing 51, and a second three-phase connecting flange 62 for connection of the second busbar housing 52.

The first single-phase connecting flange 41 of the busbar splitting module 31, which points downward, is connected to the input flange 21 of the first circuit breaker 11. The other single-phase connecting flanges of the busbar splitting module 31 are likewise connected to the input flanges of the second circuit breaker 12 and of the third circuit breaker 13.

The busbar splitting module 31 is mounted on the circuit breakers 11, 12, 13 such that the single-phase connecting flanges 41, 42, 43 point downward. Expressed in other words, the busbar splitting module 31 is arranged vertically on the circuit breakers 11, 12, 13.

The second three-phase connecting flange 62 of the busbar splitting module 31, which points upwards, is connected to the second busbar housing 52. The first three-phase connecting flange 61 of the busbar splitting module 31, which points toward the front face, is connected to the first busbar housing 51.

The first busbar housing 51 is therefore located at the side of the busbar splitting module 31, while the second busbar housing 52 is located above the busbar splitting module 31. The circuit breakers 11, 12, 13 are located underneath the busbar splitting module 31.

A respective drive 14, 15, 16 is fitted on the front face to each of the circuit breakers 11, 12, 13, of which drives only the first drive 14 of the first circuit breaker 11 can be seen in this illustration. The drives 14, 15, 16 are located under the first busbar housing 51.

A control cabinet 35, which contains components, which are not annotated in any more detail here, for controlling and monitoring the first cable outgoer panel, has an L-shaped housing and is arranged such that it partially clasps the first busbar housing 51. The long limb of the L-shaped control cabinet 35 in this case extends at right angles to the ground on the front face alongside the first busbar housing 51 and further upward, while the short limb of the L-shaped control cabinet 35 extends parallel to the ground above the first busbar housing 51, and further toward the front face. The control cabinet 35 therefore partially fills the space above the first busbar housing 51 and at the front alongside the second busbar housing 52, matching the switchgear assembly contour.

An outgoer splitting module 32 is provided for connection of the circuit breakers 11, 12, 13 to an outgoer housing 71. The outgoer splitting module 32 has three single-phase connecting flanges 44, 45, 46, of which only the fourth single-phase connecting flange 44 can be seen in this illustration. Furthermore, the outgoer splitting module 32 has a three-phase connecting flange 65, which points upward and is connected to an angle module 72.

The fourth single-phase connecting flange 44 of the outgoer splitting module 32, which points downward, is connected to the output flange 22 of the first circuit breaker 11. The other single-phase connecting flanges of the outgoer splitting module 32 are likewise connected to the output flanges of the second circuit breaker 12 and of the third circuit breaker 13.

The outgoer splitting module 32 is mounted on the circuit breakers 11, 12, 13 such that the single-phase connecting flanges 44, 45, 46 point downward. Expressed in other words, the outgoer splitting module 31 is arranged vertically on the circuit breakers 11, 12, 13.

The angle module 72 has a three-phase adaptor flange 66 which points upward and is closed in the illustration shown. By way of example, a voltage converter or a test adaptor can be connected to this adaptor flange 66, in order to carry out a high-voltage test.

The angle module 72 is located above the outgoer splitting module 32 and, at the rear, alongside the second busbar housing 52.

The angle module 72 furthermore has a three-phase outgoer flange 67 which points to the rear face and to which the outgoer housing 71 is connected. In this case, a voltage converter 75 and a quick-action grounding means 73 are attached in a known manner to the outgoer housing 71, with the voltage converter 75 pointing upward and the quick-action grounding means 73 pointing to the rear face.

Three single-phase high-voltage cables 81, 82, 83 are furthermore attached in a known manner to the outgoer housing 71, although the third high-voltage cable 83 cannot be seen in this illustration. The high-voltage cables 81, 82, 83 point downward.

A three-phase high-voltage cable is also feasible, instead of the three single-phase high-voltage cables 81, 82, 83.

A respective partition insulator is provided between each two connecting flanges of components of the switch panel which are connected to one another. A partition insulator such as this ensures that a module, for example the first busbar housing 51, can be opened and/or removed for repair or maintenance purposes, with the adjacent module, for example the busbar splitting module 31, remaining uninfluenced. This means that the insulating gas can remain in the busbar splitting module 31, since the partition insulator seals the first three-phase connecting flange 61.

The first busbar housing 51 is suspended at the front on the busbar splitting module 31, and the second busbar housing 52 rests on the busbar splitting module 31. The drives 14, 15, 16 of the circuit breakers 11, 12, 13 are located underneath the first busbar housing 51. The control cabinet 35 is L-shaped, and partially fills the space above the first busbar housing 51 and alongside the second busbar housing 52.

The angle module 72, to which the outgoer housing 71 and the other components of a cable outgoer are connected in a known manner at the rear, is located on the outgoer splitting module 32.

In this illustration, the voltage converter 75 is connected to the outgoer housing 71. The voltage converter 75 can also be connected to the three-phase adaptor flange 66, which points upward, of the angle module 72. In this case, the outgoer housing 71 has a free flange, which points upward, for connection of a test adaptor in order to carry out a high-voltage test.

This arrangement of the components in the cable outgoer panel as described here optimally utilizes the available space and thus allows a relatively compact and space-saving design.

A cable outgoer panel is illustrated in this example, that is to say a switch panel for connection to a high-voltage cable. However, the described arrangement can also be used for switch panel types to which, for example, an overhead line, a transformer or the like can be connected.

In this case, corresponding components are provided instead of the high-voltage cables 81, 82, 83, with the outgoer housing 71 being designed for connection of these components.

Figure 2:
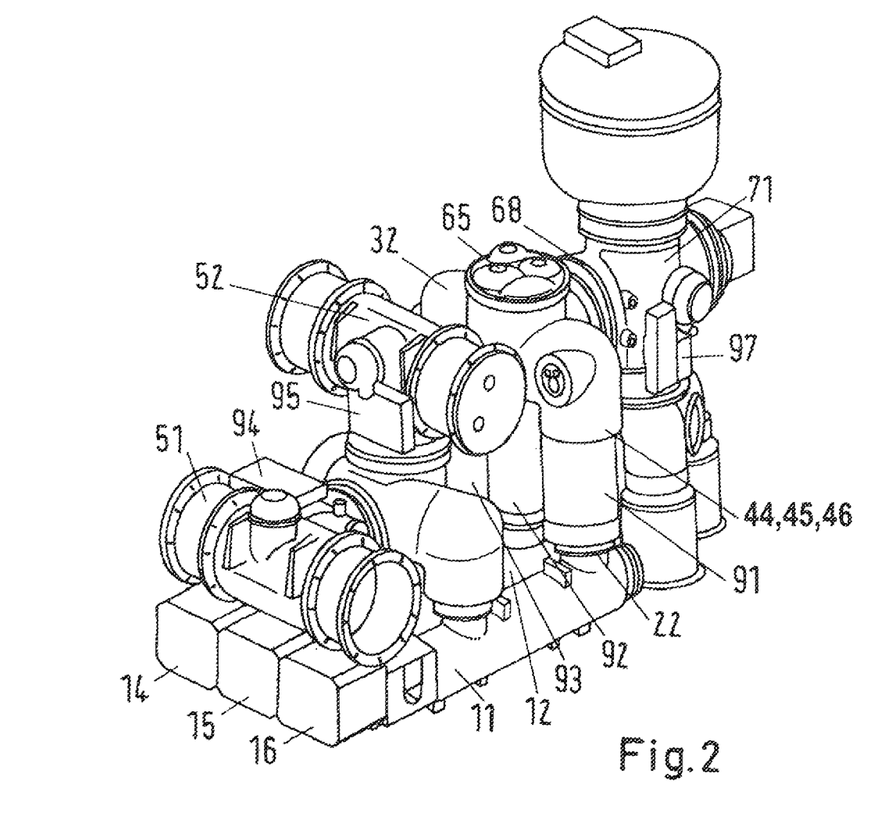
FIG. 2 shows a second cable outgoer panel of a switchgear assembly according to the invention, in the form of a perspective illustration.

FIG. 2 shows a perspective illustration of a second cable outgoer panel of a switchgear assembly according to the invention. The second cable outgoer panel illustrated here is similar to the first cable outgoer panel as shown in FIG. 1, for which reason the differences will primarily be described here. Furthermore, features are described which can be seen better in this illustration. The control cabinet 35 is not shown in this illustration.

A respective extension tube 91, 92, 93 is provided for each phase between the circuit breakers 11, 12, 13 and the outgoer splitting module 32. The first extension tube 91 is in this case connected to the fourth single-phase connecting flange 44 of the outgoer splitting module 32 and to the output flange 22 of the first circuit breaker 11. The second extension tube 92 and the third extension tube 93 are connected in a similar manner to the second circuit breaker 12 and, respectively, to the third circuit breaker 13 and the outgoer splitting module 32.

The outgoer splitting module 32 is therefore mounted on the extension tubes 91, 92, 93, which themselves are mounted on the circuit breakers 11, 12, 13, such that the single-phase connecting flanges 44, 45, 46 point downward. Expressed in other words, the outgoer splitting module 31 is arranged vertically on the circuit breakers 11, 12, 13, with the extension tubes 91, 92, 93 being arranged between the circuit breakers 11, 12, 13 and the outgoer splitting module 32.

The angle module 72 from FIG. 1 is missing. By way of example, a voltage converter or a test adaptor for carrying out a high-voltage test can be connected to the three-phase connection flange 65 of the outgoer splitting module 32, which is closed in the illustration shown.

The outgoer splitting module 32 has a three-phase output flange 68, which points toward the rear face. The outgoer housing 71 is connected in a known manner to this output flange 68.

A first drive box 94 is arranged on the first busbar housing 51. This first drive box 94 contains the drives and indication elements for the isolators/grounding means which are located in the first busbar housing 51.

A second drive box 95 is arranged at the front on the second busbar housing 52. This second drive box 95 contains the drives and indication elements for the isolators/grounding means which are located in the second busbar housing 52.

An outgoer drive box 97 is arranged at the side on the outgoer housing 71. This outgoer drive box 97 contains the drives and indication elements for the isolators/grounding means which are located in the outgoer housing 71.

Said drive boxes 94, 95, 97 are arranged such that they are relatively easily accessible and can be seen.

Figure 3:
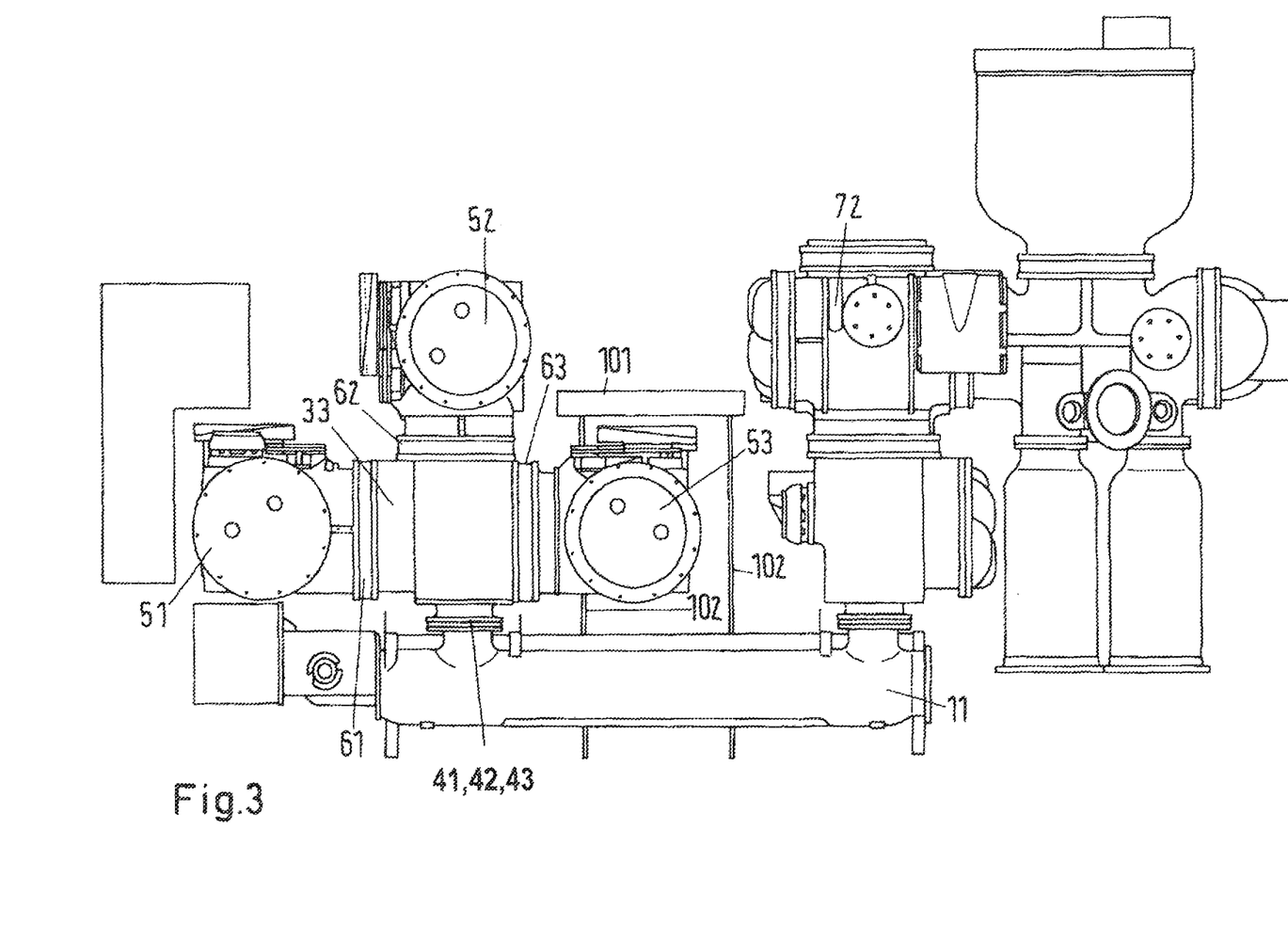
FIG. 3 shows a third cable outgoer panel of a switchgear assembly according to the invention.

FIG. 3 shows a third cable outgoer panel of a switchgear assembly according to the invention. The third cable outgoer panel shown here is similar to the first cable outgoer panel shown in FIG. 1, for which reason the differences will primarily be described here.

A triple busbar splitting module 33 which is located on the circuit breakers has—in comparison to the busbar splitting module 31 shown in FIG. 1—a further, third three-phase connecting flange 63, which points toward the rear face and is therefore opposite the first three-phase connecting flange 61.

A third busbar housing 53 is attached to the third three-phase connecting flange 63. The third busbar housing 53 is therefore suspended at the rear on the triple busbar splitting module 33.

The circuit breakers 11, 12, 13 have a greater axial extent than that shown in the illustration in FIG. 1, that is to say they are longer. Space for the third busbar housing 53 is therefore created between the triple busbar splitting module 33 and the outgoer splitting module 32.

A gangway 101 is provided above the third busbar housing 53, and rests on stilts 102. An operator can access all the parts of the third busbar housing 53 and all the angle modules 72 of all the switch panels in the switchgear assembly via this gangway 101, which extends parallel to the busbar housings 51, 52, 53.

In general, current transformers are integrated in the busbar splitting module 31, in the outgoer splitting module 32, in the triple busbar splitting module 33, and in the extension tubes 91, 92, 93. The connecting boxes of these current transformers can likewise be accessed via the gangway 101.

The gangway 101 therefore improves the accessibility to various components of the switchgear assembly.

The switchgear assembly shown here may, of course, also be designed without a gangway.

Furthermore, it is feasible for the third busbar and therefore the third busbar housing 53 to be omitted, as a result of which the cable outgoer panel is similar to that shown in FIG. 1. In this case, the gangway 101 may be arranged at a lower level, for example directly above the circuit breakers 11, 12, 13.

Figure 4:
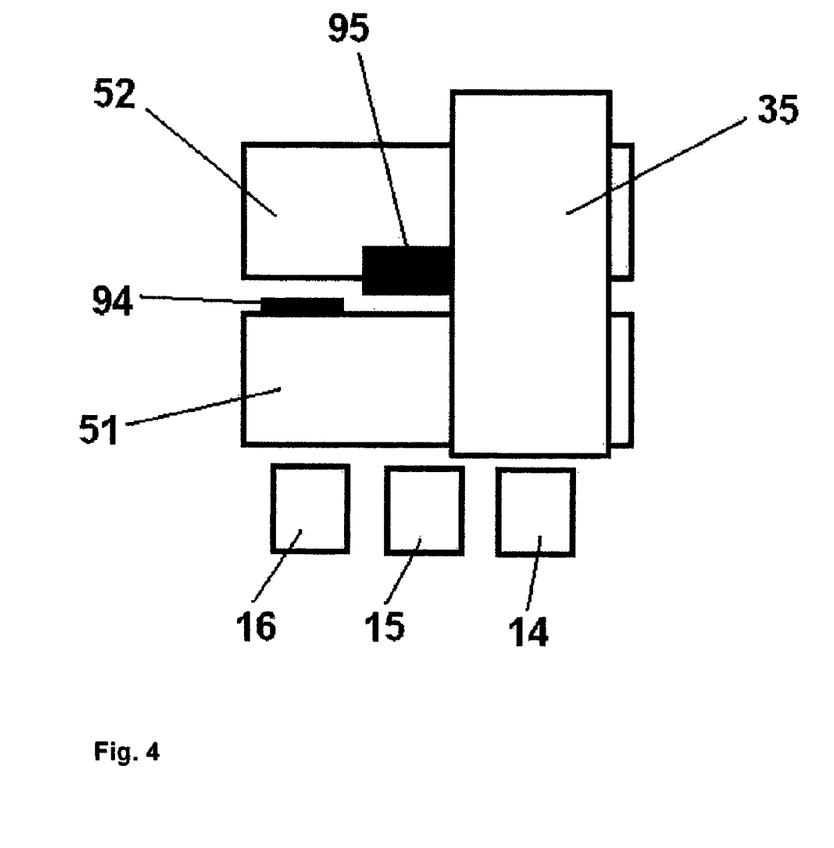
FIG. 4 shows a front view of the first cable outgoer panel from FIG. 1.

FIG. 4 shows a front view of the first cable outgoer panel from FIG. 1. The first busbar housing 51 runs horizontally above the drives 14, 15, 16 of the circuit breakers 11, 12, 13, which cannot be seen here. The second busbar housing 52 runs parallel to and above the first busbar housing 51.

Instead of said cable outgoer panel, it is, of course, also possible to provide some other switch panel, for example a feed panel or an overhead-line outgoer panel.

Both busbar housings 51, 52 are partially concealed by the control cabinet 35. The control cabinet 35 occupies only a part, for example half, of the width of the switch panel. The busbars are therefore accessible in the area at the side of the control cabinet 35. In particular, the first drive box 94 of the first busbar housing 51 and the second drive box 95 of the second busbar housing 52 can be seen and are accessible.

Figure 5:
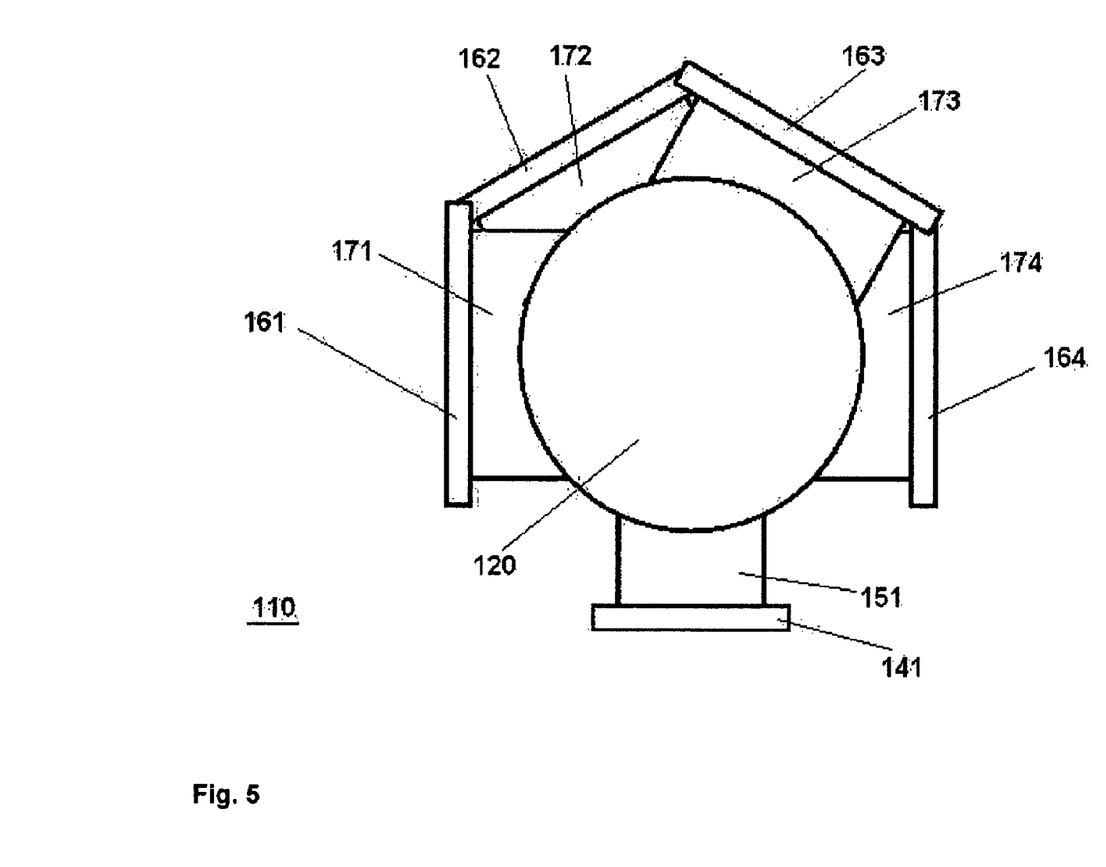
FIG. 5 shows a side view of a quadruple busbar splitting module.

FIG. 5 shows a side view of a quadruple busbar splitting module 110. The quadruple busbar splitting module 110 has an cylindrical housing body 120, whose circular end face can be seen in this illustration. As used herein, circular means approximately circular.

The quadruple busbar splitting module 110 is used for connection of three single-phase circuit breakers, which are not illustrated here, to up to four busbars, which are not illustrated here.

The quadruple busbar splitting module 110 for this purpose has four three-phase connecting flanges 161, 162, 163, 164 for connection of a respective busbar, and three single-phase connecting flanges 141, 142, 143 for connection of a respective single-phase circuit breaker.

The single-phase connecting flanges 141, 142, 143 are attached to a respective single-phase connecting stub 151, 152, 153, which project in the radial direction from the cylindrical housing body 120 of the quadruple busbar splitting module 110.

The three-phase connecting flanges 161, 162, 163, 164 are attached to a respective three-phase connecting stub 171, 172, 173, 174, which likewise project in the radial direction from the cylindrical housing body 120 of the quadruple busbar splitting module 110.

In this context, a single-phase connecting stub means a connecting stub through which a single phase conductor is passed. In this context, a three-phase connecting stub means a connecting stub through which three phase conductors of a three-phase system are passed.

The single-phase connecting stubs 151, 152, 153 are arranged on an envelope line of the cylindrical housing body 120.

In the illustration shown, the second single-phase connecting flange 142, which is attached to the second single-phase connecting stub 152, as well as the third single-phase connecting flange 143, which is attached to the third single-phase connecting stub 153, are concealed by the first single-phase connecting flange 141. In the illustration shown, the second single-phase connecting stub 152 and the third single-phase connecting stub 153 are likewise concealed by the first single-phase connecting stub 151, to which the first single-phase connecting flange 141 is attached.

The three-phase connecting stubs 171, 172, 173, 174 are arranged on different envelope lines of the cylindrical housing body 120.

The first three-phase connecting stub 171, to which the first three-phase connecting flange 161 is attached, is in this case arranged on an envelope line which is offset through 90° in the clockwise sense in the circumferential direction with respect to the envelope line on which the single-phase connecting stubs 151, 152, 153 are arranged.

The second three-phase connecting stub 172, to which the second three-phase connecting flange 162 is attached, is arranged on an envelope line which is offset through 150° in the clockwise sense in the circumferential direction with respect to the envelope line on which the single-phase connecting stubs 151, 152, 153 are arranged.

The third three-phase connecting stub 173, to which the third three-phase connecting flange 163 is attached, is arranged on an envelope line which is offset through 210° in the clockwise sense in the circumferential direction with respect to the envelope line on which the single-phase connecting stubs 151, 152, 152 are arranged.

The fourth three-phase connecting stub 174, to which the fourth three-phase connecting flange 164 is attached, is arranged on an envelope line which is offset through 270° in the clockwise sense in the circumferential direction with respect to the envelope line on which the single-phase connecting stubs 151, 152, 153 are arranged.

The first three-phase connecting stub 171 and the fourth three-phase connecting stub 174 are therefore arranged on envelope lines of the cylindrical housing body 120 which are diametrically opposite. The envelope lines on which mutually adjacent three-phase connecting stubs are arranged are each offset through 60° with respect to one another in the circumferential direction.

The three-phase connecting stubs 171, 172, 173, 174 are also arranged offset with respect to one another in the axial direction. The first three-phase connecting stub 171 and the third three-phase connecting stub 173 are arranged on a circumferential line in the axial direction. The second three-phase connecting stub 172 and the fourth three-phase connecting stub 174 are arranged on a circumferential line in the axial direction, with this circumferential line being arranged offset to the rear in the illustration shown with respect to the circumferential line on which the first three-phase connecting stub 171 and the third three-phase connecting stub 173 are arranged.

In the illustration shown, the second three-phase connecting stub 172 and the fourth three-phase connecting stub 174 as well as the second three-phase connecting flange 162 and the fourth three-phase connecting flange 164 are therefore partially concealed by the first three-phase connecting stub 171 and the third three-phase connecting stub 173, as well as by the first three-phase connecting flange 161 and the third three-phase connecting flange 163.

Busbar splitting modules with five or more three-phase connecting flanges for connection of five or more busbars are, of course, also feasible. It is also feasible for the three-phase connecting stubs to be offset through a different angle, for example 45°, with respect to one another in the circumferential direction.

Figure 6:
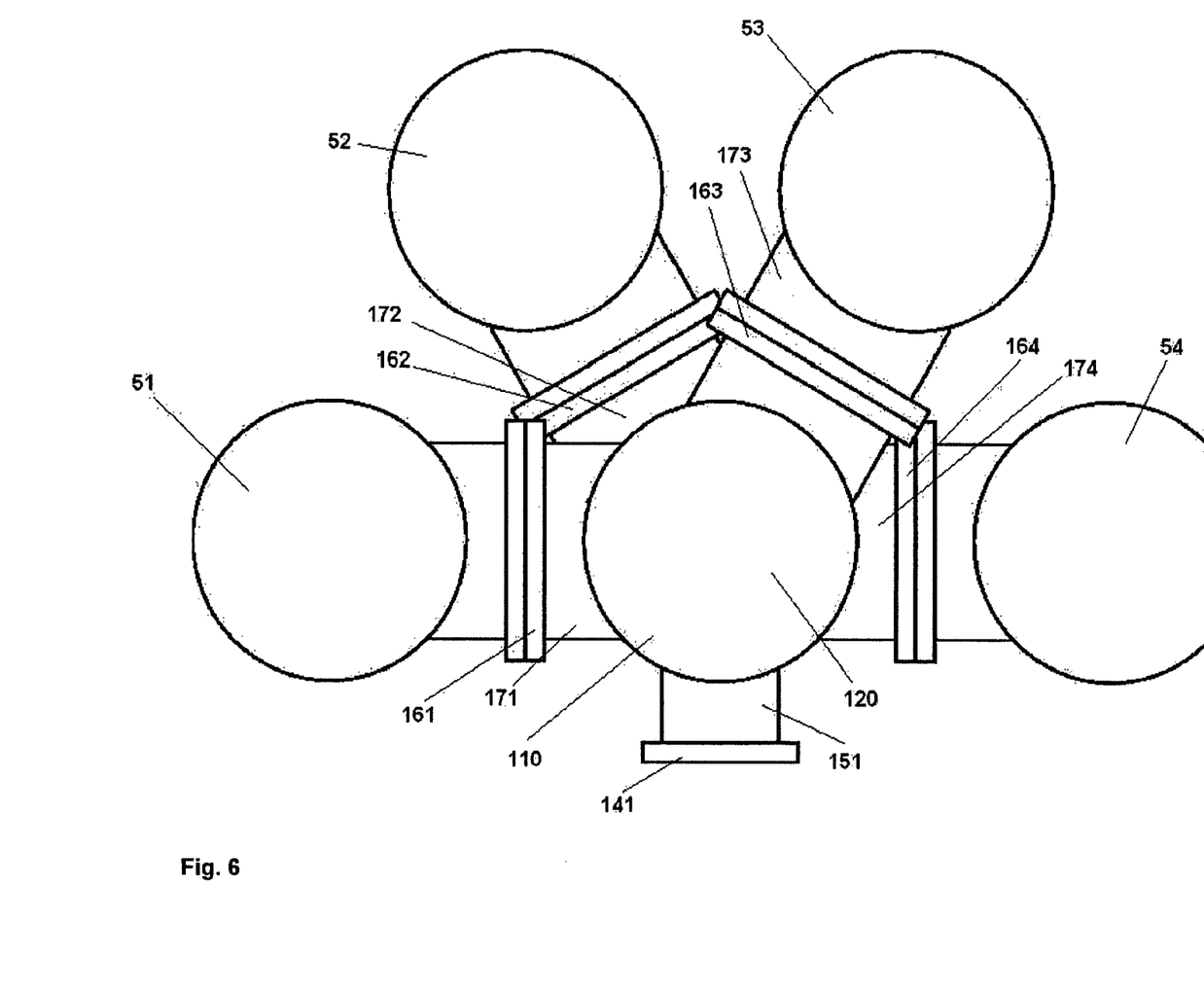
FIG. 6 shows a quadruple busbar splitting module with connected busbars.

FIG. 6 shows the quadruple busbar splitting module 110, as explained in FIG. 5, with connected busbars. In this case, a first busbar housing 51 is connected to the first three-phase connecting flange 161, a second busbar housing 52 is connected to the second three-phase connecting flange 162, a third busbar housing 53 is connected to the third three-phase connecting flange 163, and a fourth busbar housing 54 is connected to the fourth three-phase connecting flange 164.

Figure 7:
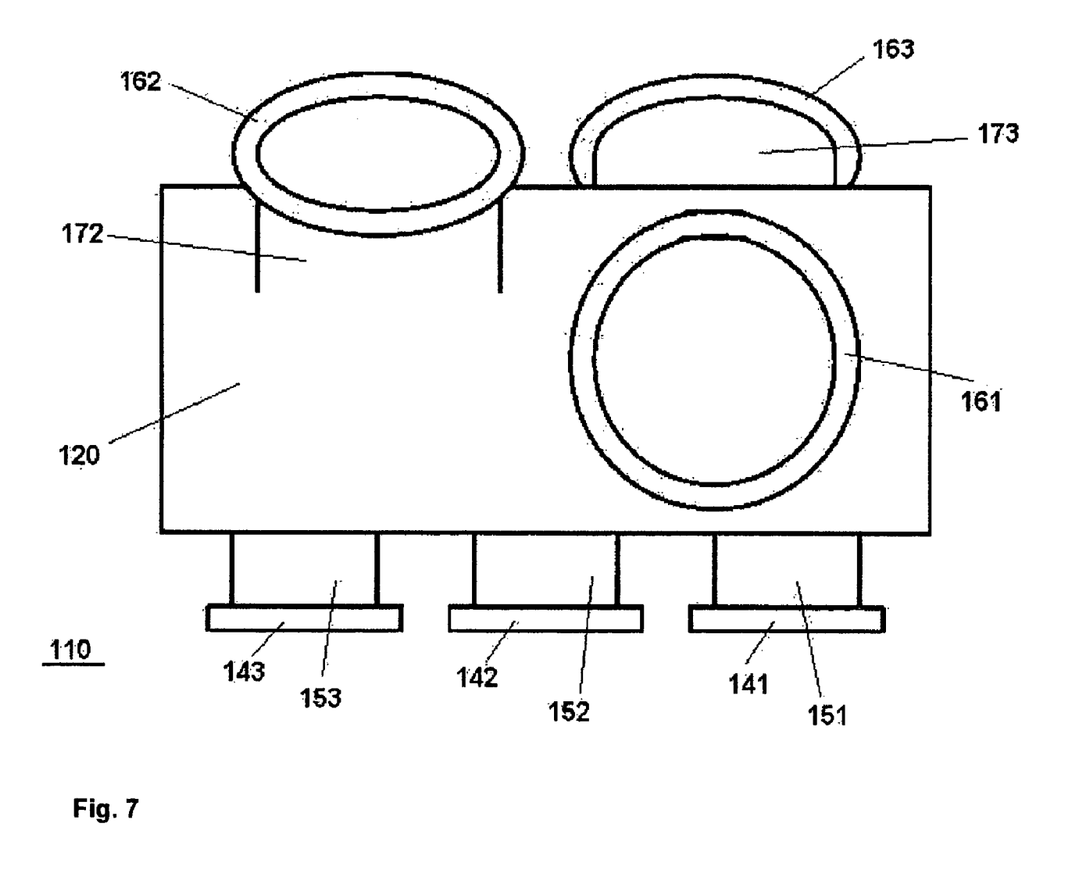
FIG. 7 shows a front view of a quadruple busbar splitting module.

FIG. 7 shows a front view of the quadruple busbar splitting module 110 as explained in FIG. 5.

The first single-phase connecting stub 151, the second single-phase connecting stub 152 and the third single-phase connecting stub 153 project in the same direction from the housing body 120 of the quadruple busbar splitting module 110. The first single-phase connecting stub 141 is attached to the first single-phase connecting stub 151, the second single-phase connecting flange 142 is attached to the second single-phase connecting stub 152, and the third single-phase connecting flange 143 is attached to the third single-phase connecting stub 153.

The first three-phase connecting stub 171, which cannot be seen in this illustration, is arranged with the first three-phase connecting flange 161 offset through 90° in the circumferential direction on the cylindrical housing body 120. The second three-phase connecting stub 172 with the second three-phase connecting flange 162 is arranged offset through a further 60° in the circumferential direction on the cylindrical housing body 120. The third three-phase connecting stub 173 with the third three-phase connecting flange 163 is arranged offset through a further 60° in the circumferential direction on the cylindrical housing body 120. The fourth three-phase connecting stub 174, which is arranged offset through a further 60° in the circumferential direction on the cylindrical housing body 120, as well as the associated fourth three-phase connecting flange 164, are concealed by the housing body 120 in this illustration, and therefore cannot be seen.

The first three-phase connecting stub 171 is arranged offset in the axial direction with respect to the adjacent second three-phase connecting stub 172. The third three-phase connecting stub 173 is likewise arranged offset in the axial direction with respect to the adjacent second three-phase connecting stub 172. Furthermore, the fourth three-phase connecting stub 174 is arranged offset in the axial direction with respect to the adjacent third three-phase connecting stub 173.

In this example, the first three-phase connecting stub 171 and the third three-phase connecting stub 173 as well as the second three-phase connecting stub 172 and the fourth three-phase connecting stub 174 are each located on the same circumferential line. It is also feasible for each of the three-phase connecting stubs to be arranged on their own circumferential line, as a result of which each of the three-phase connecting stubs is offset in the axial direction with respect to each of the other three-phase connecting stubs.

Isolators and grounding means which are arranged in the housings of the busbars in a known manner, are not illustrated here. The phase conductors are likewise not illustrated here.

LIST OF DESIGNATIONS

| | |
|---|---|
| 11 | First circuit breaker |
| 12 | Second circuit breaker |
| 13 | Third circuit breaker |
| 14 | First drive |
| 15 | Second drive |
| 16 | Third drive |
| 21 | Input flange of the first circuit breaker |
| 22 | Output flange of the first circuit breaker |
| 31 | Busbar splitting module |
| 32 | Outgoer splitting module |
| 33 | Triple busbar splitting module |
| 35 | Control cabinet |
| 41 | First single-phase connecting flange |
| 42 | Second single-phase connecting flange |
| 43 | Third single-phase connecting flange |
| 44 | Fourth single-phase connecting flange |
| 45 | Fifth single-phase connecting flange |
| 46 | Sixth single-phase connecting flange |
| 51 | First busbar housing |
| 52 | Second busbar housing |
| 53 | Third busbar housing |
| 54 | Fourth busbar housing |
| 61 | First three-phase connecting flange |
| 62 | Second three-phase connecting flange |
| 63 | Third three-phase connecting flange |
| 65 | Connection flange |
| 66 | Adaptor flange |
| 67 | Outgoer flange |
| 68 | Output flange |
| 71 | Outgoer housing |
| 72 | Angle module |
| 73 | Quick-action grounding means |
| 75 | Voltage converter |
| 81 | First high-voltage cable |
| 82 | Second high-voltage cable |
| 83 | Third high-voltage cable |
| 91 | First extension tube |
| 92 | Second extension tube |
| 93 | Third extension tube |
| 94 | First drive box |
| 95 | Second drive box |
| 97 | Outgoer drive box |

-continued

| | |
|---|---|
| 101 | Gangway |
| 102 | Stilt |
| 110 | Quadruple busbar splitting module |
| 120 | Housing body of the quadruple busbar splitting module |
| 141 | First single-phase connecting flange of the quadruple busbar splitting module |
| 142 | Second single-phase connecting flange of the quadruple busbar splitting module |
| 143 | Third single-phase connecting flange of the quadruple busbar splitting module |
| 151 | First single-phase connecting stub of the quadruple busbar splitting module |
| 152 | Second single-phase connecting stub of the quadruple busbar splitting module |
| 153 | Third single-phase connecting stub of the quadruple busbar splitting module |
| 161 | First three-phase connecting flange of the quadruple busbar splitting module |
| 162 | Second three-phase connecting flange of the quadruple busbar splitting module |
| 163 | Third three-phase connecting flange of the quadruple busbar splitting module |
| 164 | Fourth three-phase connecting flange of the quadruple busbar splitting module |
| 171 | First three-phase connecting stub of the quadruple busbar splitting module |
| 172 | Second three-phase connecting stub of the quadruple busbar splitting module |
| 173 | Third three-phase connecting stub of the quadruple busbar splitting module |
| 174 | Fourth three-phase connecting stub of the quadruple busbar splitting module |

The invention claimed is:

1. A metal-encapsulated, gas-insulated high-voltage switchgear assembly comprising:
a three-phase encapsulated busbar housing;
at least one busbar disposed in the housing;
at least three single-phase-encapsulated circuit breakers disposed horizontally;
a busbar splitting module having at least one three-phase connecting flange configured to connect to the busbar housing and at least three single-phase connecting flanges pointing downward configured to connect to the at least three single-phase-encapsulated circuit breakers; and
an outgoer splitting module having at least one three-phase flange and at least three single-phase flanges pointing downward and configured to connect the at least three single-phase-encapsulated circuit breakers to a three-phase-encapsulated outgoer housing.

2. The high-voltage switchgear assembly as recited in claim 1, further comprising at least one isolator and at least one grounding element disposed in the busbar housing, each one of the at least one isolator and at least one grounding element being associated with the at least one busbar.

3. The high-voltage switchgear assembly as recited in claim 1, further comprising at least one extension tube for each phase disposed between the outgoer splitting module and the at least three single-phase-encapsulated circuit breakers.

4. The high-voltage switchgear assembly as recited in claim 1, further comprising an outgoer flange configured to connect the outgoer housing and an angle module disposed on the outgoer splitting module and having an adaptor flange configured to connect one of a voltage converter and a test adapter.

5. The high-voltage switchgear assembly as recited claim 1, further comprising a gangway disposed between the busbar splitting module and the outgoer splitting module and extending parallel to the busbar housing.

6. The high-voltage switchgear assembly as recited in claim 1, further comprising a control cabinet having an L-shaped housing and partially clasping the busbar housing.

7. The high-voltage switchgear assembly as recited in claim 6, wherein the control cabinet occupies only a part of a width of a switch panel.

8. The high-voltage switchgear assembly as recited in claim 1, further comprising at least four three-phase connecting flanges disposed on the busbar splitting module.

9. The high-voltage switchgear assembly as recited in claim 8, wherein the busbar splitting module has a cylindrical housing body, and at least four three-phase connecting stubs project in a radial direction out of the busbar splitting module, each being attached to one of the at least four three-phase connecting flanges.

10. The high-voltage switchgear assembly as recited in claim 9, wherein each one of the at least four three-phase connecting stubs is disposed offset with respect to an adjacent one of the at least four three-phase connecting stubs in an axial direction and in a circumferential direction of the cylindrical housing body.

* * * * *